May 11, 1965

C. E. ENTENMANN 3,182,397

CAKE RELEASE CUTTER

Filed Dec. 20, 1963

INVENTOR.
CHARLES E. ENTENMANN,
BY
McMorrow, Berman & Davidson
ATTORNEYS.

United States Patent Office 3,182,397
Patented May 11, 1965

3,182,397
CAKE RELEASE CUTTER
Charles E. Entenmann, 1724 5th Ave., Bay Shore, N.Y.
Filed Dec. 20, 1963, Ser. No. 332,024
3 Claims. (Cl. 30—301)

This invention relates to the general field of kitchen utensils and, more specifically, the instant invention pertains to facilitate the removal of baked food products from their respective baking dishes or pans.

To those skilled in this art it is a well-known fact that considerable difficulty is encountered in effecting the release of a baked cake from its baking pan without damaging the same, and/or decreasing the volume thereof. As a general rule, and in the baking of angel food cakes, in particular, knives are commonly used to separate the cake from the baking pan or the baking pans may be banged to effect separation of the cake therefrom. In the first instance, especially upon large-scale production, much time is consumed thereby increasing labor costs materially, and in the second case, the pans are frequently damaged, thereby increasing maintenance costs. Furthermore, it is well known in the bakery profession that in the simultaneous baking of a plurality of cakes requiring the use of multiple pans it is difficult to obtain uniform shapes of the finished cake and the pans are frequently damaged in effecting release of the cake therefrom.

Hence, one of the primary objects of this invention is to provide means overcoming the above disadvantages and wherein the means effects a quick and efficient utensil for separating baked products from their respective baking pans.

Another object of this invention is to provide an instrument for effecting separation of bakery goods from their baking pans without damaging the product and/or in any way reducing the volume thereof.

This invention contemplates, as a still further object thereof, a cake-release cutter which is non-complex in construction and assembly, inexpensive to manufacture and maintain, and which is durable in use.

Other and further objects and advantages of the instant invention will become more manifest from a consideration of the following specification when read in conjunction with the annexed drawing, in which.

Figure 1:
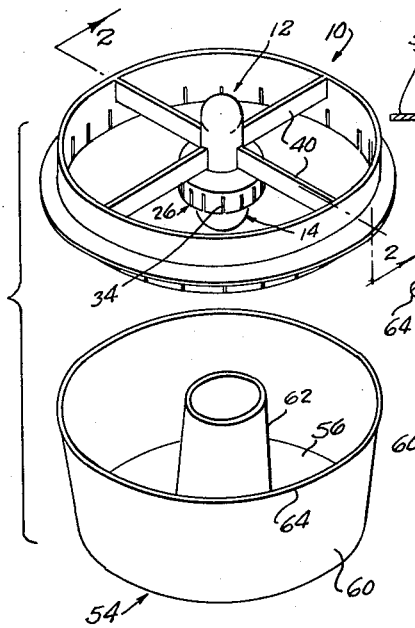
FIGURE 1 is an exploded perspective view of a cake-release cutter constructed in accordance with this invention, the cutter being shown in association with a conventional angel food baking pan.

Referring now more specifically to the drawing, reference numeral 10 designates, in general, a cake-release cutter constructed in accordance with the teachings of this invention. As is illustrated in the drawing, the cutter 10 is seen to comprise a substantially hollow cylindrical integrally-connected handle 12 and guide 14.

The handle 12 includes a cylindrical sidewall 16 closed at its normally upper end by a dome-shaped end wall 18. The lower end of the handle 12 is open and terminates in an outwardly-extending circumferential flange 20. Integral with and depending from the circumferential marginal edge of the flange 20 is a substantially hollow cylindrical sidewall 22 forming a part of the guide 14. As is seen in the drawing, the lower or other end of the sidewall 22 is closed by a dome-shaped end wall 24. As is clearly shown in FIGURE 2, the interiors of both the handle 12 and guide 14 are in open communication with one another.

Figure 2:
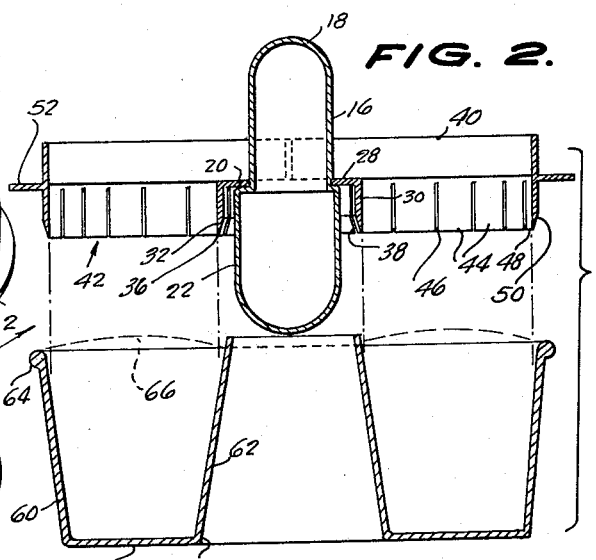
FIGURE 2 is an enlarged detail, cross-sectional view, FIGURE 2 being taken substantially on the vertical plane of line 2—2 of FIGURE 1, looking in the direction of the arrows.
Figure 3:
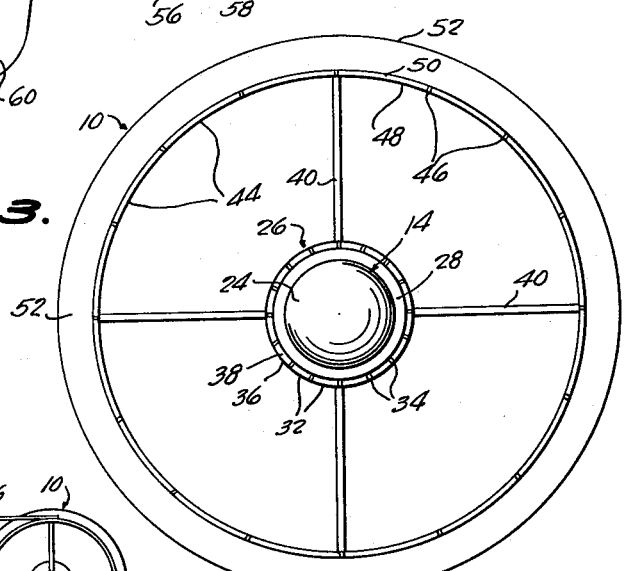
FIGURE 3 is a bottom plan view of the cake-release cutter.

Reference numeral 26 denotes, in general, a first cutter constructed in accordance with this invention. The cutter 26 is seen to comprise an annular member 28 which is telescoped over the cylindrical sidewall of the handle 12 and rests upon the circumferential flange 20 to which it is fixedly secured by any conventional means as, for example, by welding. The annular member 28 projects beyond the sidewall 22 of the guide 14, and depending from the outer peripheral marginal edge therefrom is a substantially cylindrical first cutter plate 30. As is shown in FIGURE 2, the cutter plate 30 is disposed in spaced and concentric relation relative to the sidewall 22. Preferably, but not necessarily, the cutter plate 30 is formed with a plurality of circumferentially-spaced individual cutter blades 32 formed by slotting the same as at 34, the slots extending inwardly from the lower free edge of the cutter plate 30. The lower ends of each of the cutter blades 32 are provided with a cutting edge 36 formed by grinding the inner surfaces thereof, as at 38, so that the surfaces 38 lie in a frustoconical plane.

Fixedly connected to the cylindrical sidewall 16 and to the annular member 28 are a plurality of elongated substantially rectangular braces 40 which radiate therefrom and which have a substantially hollow cylindrical second cutter plate fixedly secured thereto. As in the case of the first cutter plate 30, the second cutter plate 42 comprises a substantially hollow cylindrical member and is provided with a plurality of cutter blades 44 formed by axially-slotting, as at 40, the lower end of the cutter plate 42 at circumferentially-spaced intervals. The slots 46 extend axially of the cutter plate 42 for substantially one-half the width thereof.

The cutter blades 44 are all provided with a cutting edge 48 formed by grinding or otherwise removing material at the lower edges thereof so that the lower ends of the cutter blades 44 are provided with surfaces 50 all disposed in a frusto-conical plane.

As is seen in FIGURE 2, the cutting edges 36 and 48 are all disposed in a common horizontal plane.

To serve a function to be described, and again referring to FIGURE 2, it is seen that surfaces 36, 50 face away from each other.

Reference numeral 52 denotes an outwardly-extending circumferential flange which is, preferably, integrally formed with the cutter plate 42 substantially centrally of the ends thereof.

At 54 is indicated a conventional angel food baking pan which includes a substantially cylindrical base wall 56 centrally apertured as at 58, and an outwardly-flaring cylindrical sidewall 60 projecting from the outer peripheral marginal edge thereof. The baking pan 54 includes the usual frusto-conical center flute 62, the base end of which surrounds the aperture 58 at the circumferential marginal edge thereof. In the customary manner, the center flute 62 is seen to project slightly above the rim or bead 64 at the upper end of the sidewall 60.

In conventional practice, the cake pan 54 is charged with a specific amount of cake dough depending, of course, upon the size of the cake to be baked. The pan 54, together with its charge, is then inserted into a baking oven. As the baking takes place, the dough will expand and eventually reach the level indicated in FIGURE 2 by reference numeral 66. This level is generally above the rim or bead 64 of the pan 54. Under these circumstances, it becomes most difficult to remove the baked cake from the pan 54 without damaging the same, reducing the volume thereof, or inflicting damage to the pan 54. To negate these disadvantages the present cutter has been devised.

To use the instant cutter, it is only necessary for the operator to insert the sidewall 22 within the upper end of the center flute 62, the sidewall 22 telescoping within the wall 62 in order to serve as a guide for the cutter elements. As the sidewall 22 descends within the center flute 62, the cutting edges 36, 48 of the cutter blades 32, 44, respectively, penetrate the cake, and the cutter blades 32 engage against the center flute 62 while the cutter blades 44 engage against the sidewall 60. It will be observed that the angle of the surfaces 38 and 50 is such as to complement, to some extent, the angularity of the center flute 62, as well as the sidewall 60. Due to the slitting of the cutter plates 30, 42 the blades 32, 44 have imparted thereto a certain resilience so that the same may flex as the cutter 10 is forced downwardly within the pan 54. The descent of the cutter 10 is, of course, limited by the engagement of the flange 52 with the rim or bead 64.

As the cutter 10 descends, the blades 32 and 44 engage, respectively, the sides of the center flute 62 and sidewall 60, causing the upper end of the cake to be severed therefrom. Thereafter, it is no problem to remove the cutter 10, invert the pan 54, to effect removal of the cake.

Figure 4:
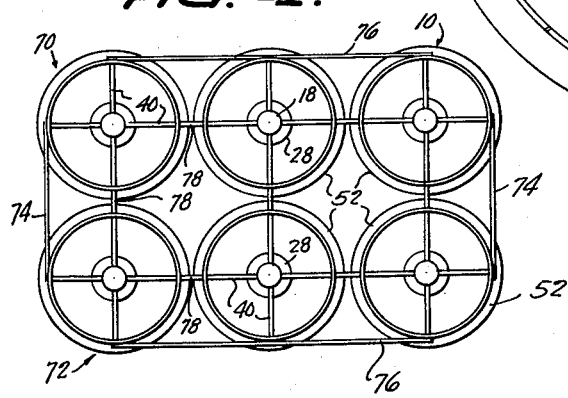
FIGURE 4 is a top plan view illustrating a plurality of cake-release cutters rigidly connected together for use in the baking of a plurality of cakes.

In FIGURE 4 a second embodiment of this invention has been illustrated. In this modification, it has been shown that the cutters 10 may be assembled in bank in order to accommodate a plurality of baking pans 54. The structure of the cutter 10 as set forth above is identical to that shown in FIGURE 4, and consequently, the same reference numerals have been applied thereto.

In FIGURE 4, a substantially rigid structure has been shown for connecting together a plurality of the cutters 10. The rigid structure is in the nature of framework which is welded, or otherwise fixedly secured to a plurality of the cutters 10.

As illustrated, three of the cutters 10 are arranged in spaced, diametrically-aligned relationship to form a first series of cutters, a first series 70 of cutters 10. Reference numeral 72 indicates a second series of cutters 10 similarly arranged. The first and second series of cutters 70, 72 are juxtaposed relative to each other, but in spaced relation with respect to one another, the cutters in each of the two series being disposed in side-by-side pairs.

Remotely-disposed pairs of cutters 10 are connected together by means of elongated substantially flat rectangular bars 74, the bars 74 extending above the flanges 52 and having their respective ends secured to the upper unslotted portion of their respective second cutter plates 42. Each series, 70 and 72, respectively, is fixedly secured to flat substantially rectangular bars 76.

Extending between each adjacent pair of cutters 10 and fixedly connected to the cutter plates 42 in the same manner is a plurality of connector bars 78. Thus, it is seen that each of the cutters 10 of the first series 70 and of the second series 72 is rigidly connected to one another by means of the bars 74 and 76, respectively, and that each adjacent one of the pairs in any given series is also rigidly connected with one another through bar 78 and that each adjacent pair in each series is also rigidly connected together through the same means.

It is obvious that by using cutters in block, much time may be saved in dislodging cakes and other foods from their respective baking pans or dishes, especially where food is produced on a commercial basis.

Having described and illustrated one embodiment of this invention in detail, it will be understood that the same is offered merely by way of example, and the scope of this invention is to be limited only by the appended claims.

What is claimed is:

1. A kitchen utensil comprising a cutter plate for separating a baked product from a baking pan having substantially cylindrical centrally-apertured base wall, a sidewall flaring outwardly from the outer peripheral marginal edge of said base wall, and a frusto-conical centrally-disposed flute projecting laterally from said base wall in the same direction as said sidewall with the base of said frusto-conical flute surrounding said aperture at its circumferential marginal edge, said cutter comprising a substantially hollow cylindrical cutter plate having a pair of opposed ends, said cutter plate having a sharpened edge at one end thereof for sliding engagement with said sidewall, a handle member comprising an elongated substantially hollow cylindrical member having a pair of opposed normally open lower and closed upper ends, respectively, said handle member including a substantially cylindrical sidewall, said handle member being disposed centrally of said cutter plate, a plurality of braces having one of their respective ends fixedly secured to said cylindrical sidewall adjacent said open lower end of said cylindrical sidewall and the other of their respective ends fixedly secured to said cutter plate, said cylindrical sidewall at its open end terminating in an outwardly-turned substantially circumferential flange, an annular member telescopically mounted over said cylindrical sidewall and resting on said flange below said braces, means fixedly securing said annular member on said flange, said annular member having a second hollow cylindrical cutter plate depending therefrom, said second cutter plate being adapted to engage the frusto-conical center flute to disengage food particles therefrom, and guide means for centering said cutter plates, said guide means comprising a substantially hollow cylindrical sidewall depending from said circumferential flange, said last-named cylindrical sidewall of said guide means being adapted for insertion through the open apex end of said center flute.

2. A kitchen utensil as defined in claim 1, wherein each of said cutter plates is disposed in concentric relation relative to the other, and each of said cutter plates being provided with a plurality of slots formed in the lower adjacent ends thereof and which extend transversely therethrough in circumferentially-spaced relationship to form a plurality of cutter blades.

3. A kitchen utensil as defined in claim 2, wherein said adjacent ends of said cutter plates are provided with cutting edges, respectively.

References Cited by the Examiner
UNITED STATES PATENTS

| | | | |
|---|---|---|---|
| 935,576 | 9/09 | Bates | 30—301 |
| 1,189,061 | 6/16 | Claypool | 30—301 |
| 1,590,633 | 6/26 | Lee | 30—201 |
| 2,046,540 | 7/36 | Anello et al. | 30—301 |
| 2,290,648 | 7/42 | McCain | 30—301 |
| 2,499,309 | 2/50 | Harris | 30—316 X |
| 2,726,440 | 12/55 | Jowers | 30—316 X |

WILLIAM FELDMAN, *Primary Examiner.*

MILTON S. MEHR, *Examiner.*